Oct. 18, 1927. 1,646,004
A. C. BECKMAN
CORN HARVESTING AND HUSKING MACHINE
Filed Aug. 21, 1925  5 Sheets-Sheet 1

Oct. 18, 1927.  1,646,004
A. C. BECKMAN
CORN HARVESTING AND HUSKING MACHINE
Filed Aug. 21, 1925   5 Sheets-Sheet 3

Arthur C. Beckman
Inventor

By William L. Symons
Attorney

Oct. 18, 1927.
A. C. BECKMAN
1,646,004
CORN HARVESTING AND HUSKING MACHINE
Filed Aug. 21, 1925   5 Sheets-Sheet 4
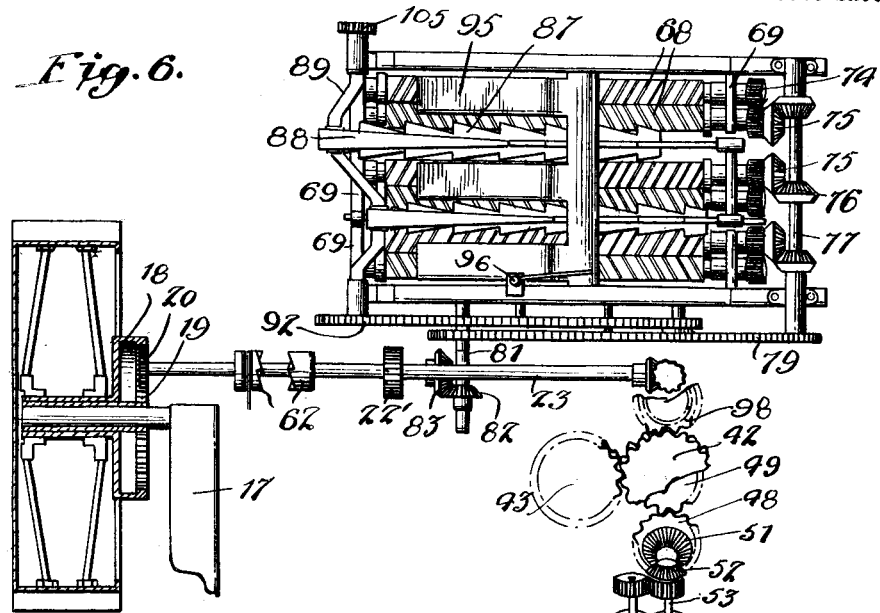
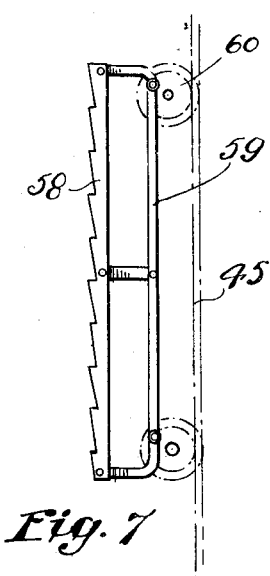
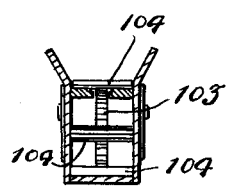
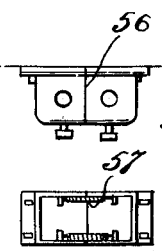
Arthur C. Beckman
Inventor
By William L. Symons
his Attorney Oct. 18, 1927. 1,646,004
A. C. BECKMAN
CORN HARVESTING AND HUSKING MACHINE
Filed Aug. 21, 1925   5 Sheets-Sheet 5
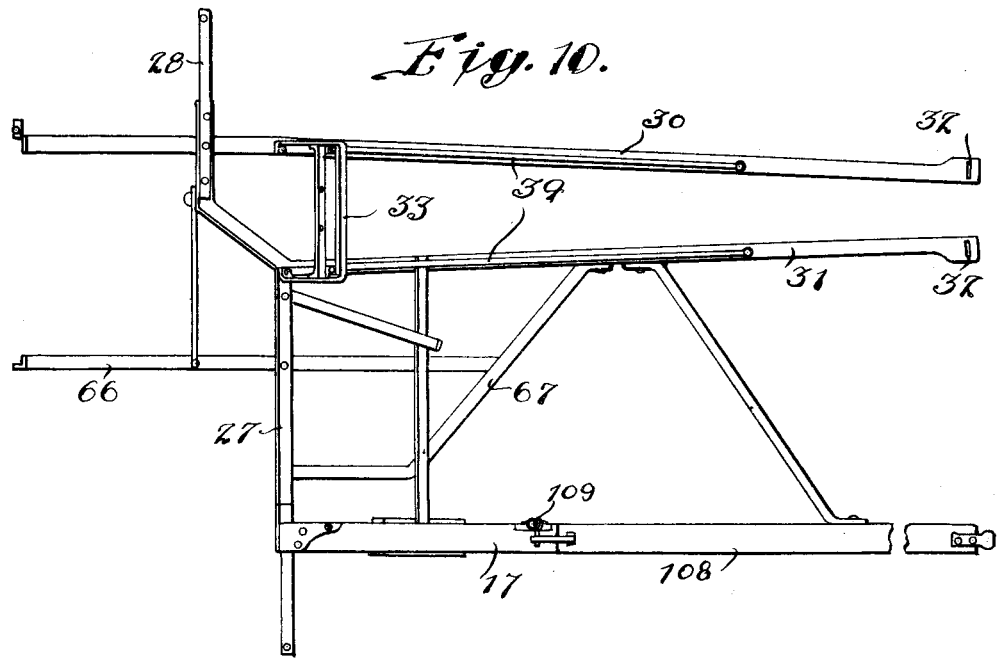
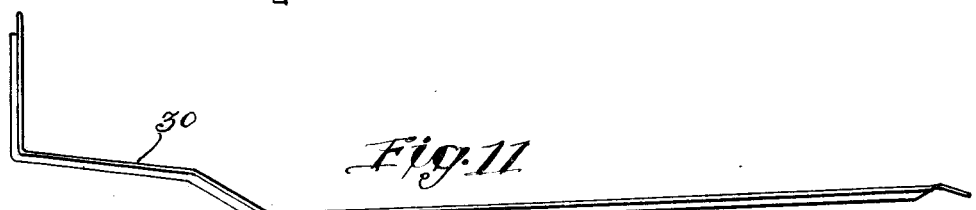
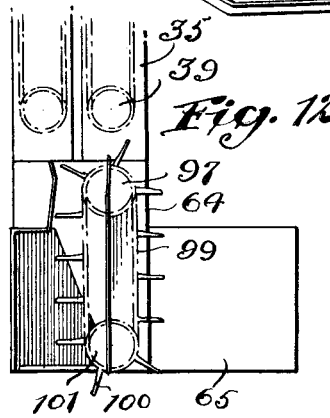
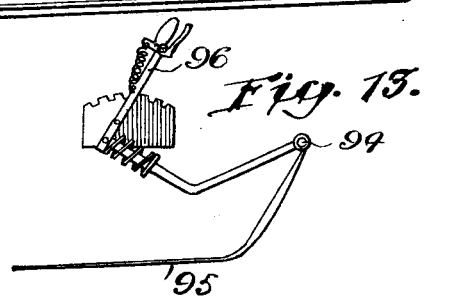
Arthur C. Beckman
Inventor
By William L. Symons
his Attorney Patented Oct. 18, 1927.

1,646,004

UNITED STATES PATENT OFFICE.

ARTHUR C. BECKMAN, OF MOUND CITY, SOUTH DAKOTA.

CORN HARVESTING AND HUSKING MACHINE.

Application filed August 21, 1925. Serial No. 51,624.

My invention relates to improvements in harvesters and more especially to that type of harvester used for gathering corn.

An important object of my invention is the provision of a device of the above mentioned character in which husking apparatus is combined with the harvester in a simple and light assembly.

Another object of my invention is to provide a device of this character in which the harvesting and husking apparatus are operated from a single drive wheel.

A further object of my invention is to provide improved means for kicking the ears from the stalk.

Still another object of my invention is the provision of means whereby the planks and snapping rollers will allow the passage of excessive loads of stalks.

A still further object of my invention is the provision of means for straightening the ears on the husking rollers and for pressing the ears against said rollers.

Yet another object of my invention is to provide means for allowing spreading of the husking rollers.

Other objects and advantages of my invention will be apparent during the course of the following description.

Figure 1:
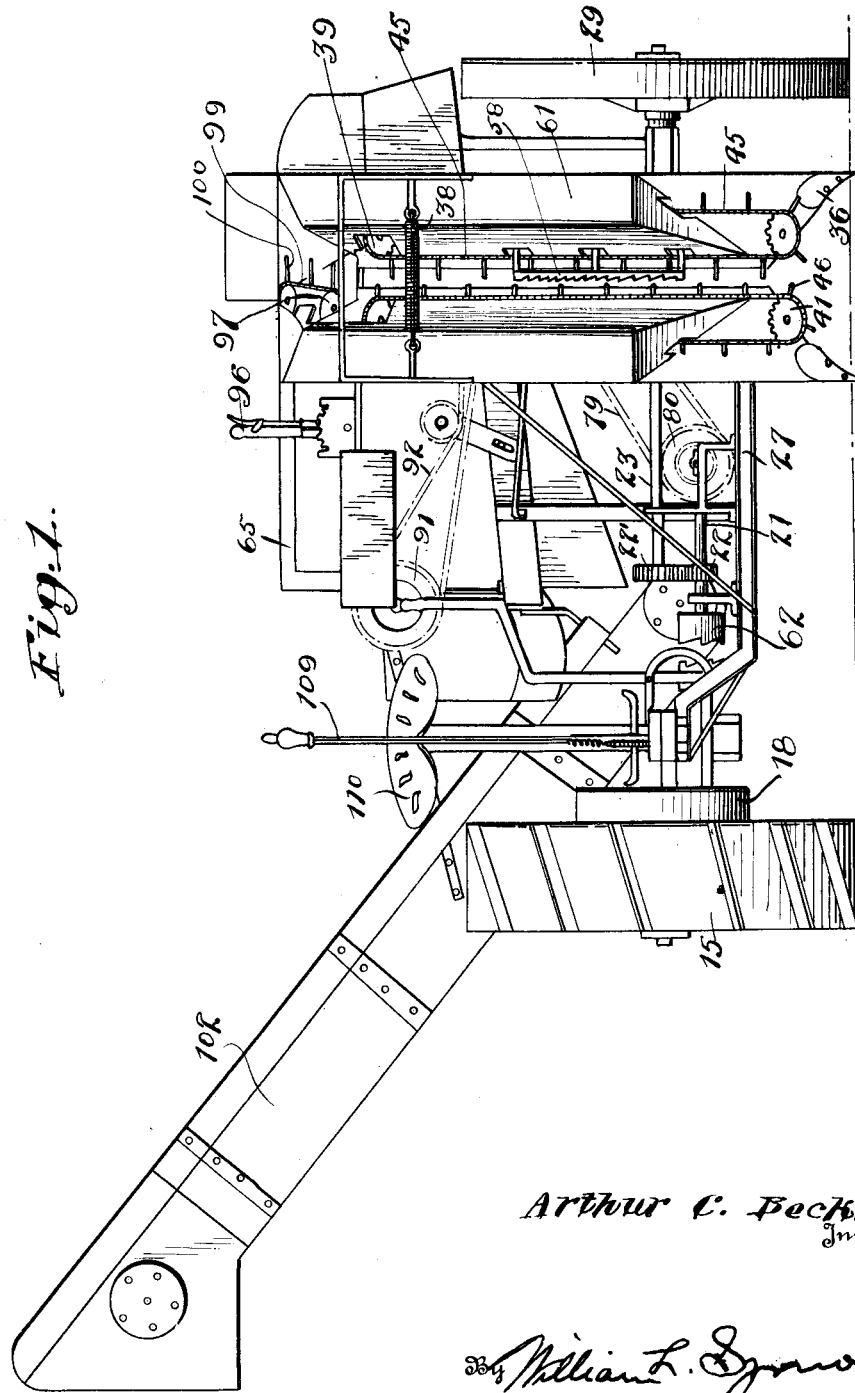
Figure 2:
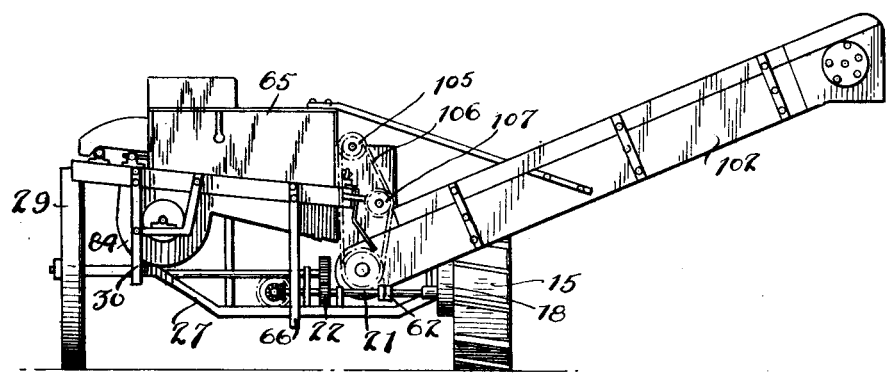

In the accompanying drawings which form a part of this specification wherein like characters of reference denote like corresponding parts, Fig. 1 is a front elevation of my improved machine, Fig. 2 is a rear view of the same.

Figure 3:
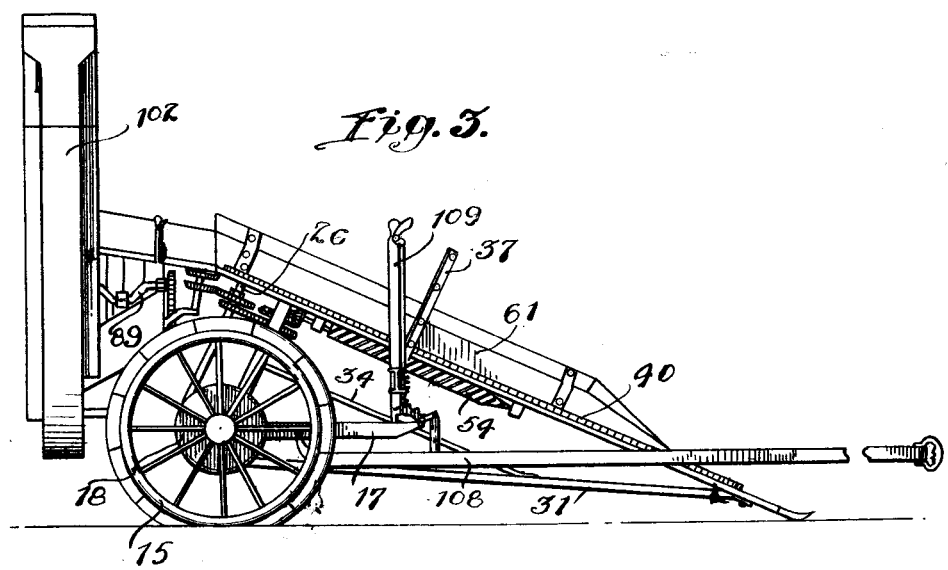
Figure 4:
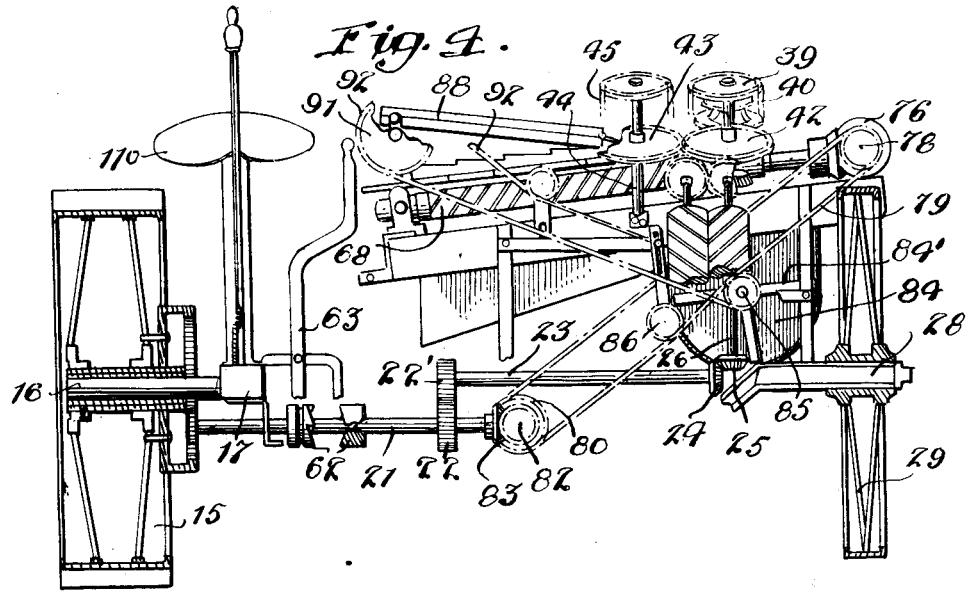
Figure 5:
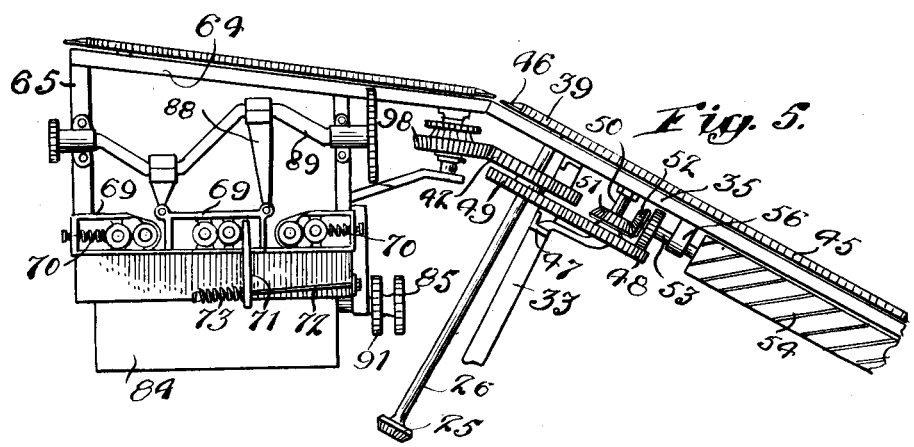

Fig. 3 is a side elevation thereof,

Fig. 4 is a detail transverse section looking towards the rear of this machine, parts being broken away, Fig. 5 is a longitudinal section of a portion of the machine, Fig. 6 is a top plan view of a portion of the machine including the husking mechanism, Fig. 7 is a plan view of the kicker, Fig. 8 is a transverse section through the elevator, Fig. 9 is a detail of the snapping roller journals, Fig. 10 is a plan view of the frame of my machine, Fig. 11 is a side elevation of one of the frame members, Fig. 12 is a top plan view of a portion of the machine, and Fig. 13 is a detail of the husking springs and the adjusting means therefor.

In the drawings, wherein for the purpose of illustration is shown a preferred embodiment of my invention, the numeral 15 designates the drive wheel provided with the usual cleats and mounted upon the stub axle 16, which is suitably supported on the beam 17 which is arranged longitudinally of the machine. A gear casing 18 is bolted to the wheel preferably by means of the spokes thereof, and contains an internal gear 19 which meshes with the small pinion gear 20 which is mountetd on the transverse shaft 21. A gear 22 is arranged adjacent the end of the shaft 21 and meshes with a similar gear 22' on a shaft 23 arranged above and parallel to the shaft 21. The end of the shaft 23 is provided with a bevel gear 24 which meshes with a bevel gear 25 on the shaft 26 which is arranged at a right angle to the shaft 23 and extends upward therefrom at a slight angle from the vertical.

The main cross frame member 27 supports the beam 17 and is offset at its opposite end, said offset end serving to support the axle 28 which carries the wheel 29. The main longitudinal frame bar 30 is arranged adjacent the wheel 29 and extends back of the cross member 27 for a substantial distance, and is turned up vertically at said rear end for a purpose hereinafter described. This bar 30 extends forward of the wheels and complements a second bar 31, the two bars converging towards their forward ends which are enlarged and provided with transversely extending slots 32 the enlarged portions being inclined downwardly. An inverted U-shaped supporting frame 33 is secured at its lower ends to the bars 30 and 31, and braces 34 extend from the upper portion of said frame 33 to the forward ends of the bars 30 and 31. Planks 35 are secured to the frame 33 and bolted to the slots 32, these planks being spaced a slight distance apart, and extending beyond the ends of the bars 30 and 31 to a point adjacent the ground level, their ends being cut away to form an entrance to the space between the planks, and provided with metal guards 36 which are pointed at their ends.

An inverted U-shaped brace 37, preferably formed of spring metal, joins the outside portions of the planks and has its ends under tension of the coil spring 38 thereby allowing spreading of the planks under pressure.

The shaft 26 extends through one of the planks and has a cog wheel 39 mounted upon its end just above the surface of the plank. A chain 40 is arranged around this cog wheel and extends for the greater portion of the length of the plank, where it goes around and idler cog gear 41. Arranged below the plank, and mounted on the shaft 26 is a gear 42 which meshes with a similar gear 43 mounted on the stub shaft 44 which extends through the other of the planks and drives a chain 45 in the same manner that the chain 40 is driven. These chains 40 and 45 are provided with spaced lugs 46 which extend over the space between the planks.

The frame 33 is provided with a cross bar 47 upon which is mounted a gear 48 which meshes with a gear 49 on the shaft 26. Secured to the gear 48 is a stub shaft 50 on which is mounted a bevel gear 51 which engages a bevel gear 52 on the snapping roller shaft 53. The snapping roller 54 is mounted beneath the planks and parallel therewith. The roller 54 is intergeared with another roller 55 which turns in the opposite direction from the roller 54. These rollers are provided with spiral grooves and are mounted in brackets 56 which are formed in two sections held together by springs 57 which allow the rollers to be spread apart.

A kicker 58 comprises a bar having a serrated edge which is mounted upon a frame 59 which in turn is mounted upon pins arranged eccentrically on cogs 60 which are rotated by the chain 45 and give a reciprocatory motion to the kicker, which moves over the space between the planks with a circular motion.

Guards 61 are arranged upon the planks and have openings for the chains and kicker. A clutch mechanism 62 is arranged upon the the shaft 21 and is operated by means of a lever 63.

Arranged at the upper end of the planks and forming a continuation of said planks, although at an angle much nearer the horizontal, is a plank 64 which extends rearward of the planks and over the husker casing 65, which is arranged transversely of the machine and supported at the upturned end of the bar 30 and the upturned end of the bar 66 which is secured to the cross bar 27 and to the brace bar 67 connecting the bars 31 and 27.

Husking rolls 68 are arranged in pairs within the lower portion of the casing 65, the rolls being provided with oppositely arranged spiral grooves. The stems of the rolls extend through brackets 69 at both ends of the casing, there being preferably three pairs of rollers and three brackets at each end of the casing. One of each pair of rollers being stationarily though rotatably, mounted in the brackets, the other of each pair being arranged to slide in the brackets against the tension of a spring. The end brackets are provided with coil springs 70 between the movable roll and the end of the brackets. The movable roll of the center pair of rolls bears against an arm 71 which extends below the bracket and has a rod 72 passed through its lower end, there being a coil spring 73 arranged on said end and bearing against the arm 71. It will be seen that the rolls are capable of being spread apart, under pressure.

Thesse rolls are arranged at an angle and slant downwardly away from the plank 64. Their upper stems are provided with cogs 74, the cogs of each pair intermeshing. One of the rolls of each pair is provided with a bevel gear 75 which meshes with a bevel gear 76 on the shaft 77 arranged at the end of the casing 65. The forward end of the shaft 77 is provided with a gear wheel 78 over which a chain 79 is passed. This chain extends at an angle downwardly and passes over a gear wheel 80 carried by a stub shaft 81 arranged adjacent and at a right angle to the shaft 23. A bevel gear 82 on the shaft 81 meshes with a bevel gear 83 on the end of the shaft 23.

A casing 84 is arranged below the rolls 68 to catch the huskings and a fan 84 is arranged within said casing, the shaft of said fan having a gear 85 on the outside of the casing which engages the chain 79. A chain tightener 86 is arranged between the gears 80 and 85 to hold the chain against the gear 85.

Ear straighteners comprise straightening elements 87 having jagged edges and stems at each end which fit in bearings in the center brackets 69. There is one of these straighteners arranged between each pair of rolls and they are arranged a slight distance above the rolls. These straighteners are caused to reciprocate by means of links 88 which connect the straighteners with the cranks of a crank shaft 89 having its forward end provided with a gear 90 which connects with a gear 91 formed integrally with the gear 85 by means of the chain 92. A chain tightener 93 is suitably secured to the husker casing.

A shaft 94 is pivotally arranged transversely across the husker casing and a substantial distance above the rolls. A metal sheet having spring arms 95 depends from the shaft and has its arms bent so as to parallel the rolls, as shown. The spring arms are arranged a slight distance above the rolls directly over the center of each pair of rolls, and therefor not over the straightener. A hand lever 96 serves to adjust the distance of the arms above the rolls.

A gear wheel 97 is arranged on the plank 64 adjacent the gear 39 and is geared to the shaft 26 by means of the gear 98. A chain 99 having lugs 100 passes around the gear 97 and around the idler gear 101 arranged at the rearward end of the plank 64. The plank 64 is cut away diagonally and the lugs 100 extend over the cut away portion.

An elevator 102 is arranged with its lower end adjacent the lower or discharge end of the husker casing and has a chain 103 provided with angle iron lugs 104 for elevating the ears of corn. The lugs and elevator are so arranged that the lugs contact with the lower wall of the elevator, the ends of the elevator being rounded for this purpose and any shelled corn will be carried along with the ears. The chain is operated by means of the gear 105 arranged on the end of shaft 89 and driving a chain 106. This chain is kept tight by means of chain tightener 107.

A suitable draft tongue 108 is pivotally connected to the beam 17 and its relative position thereto is adjusted by the hand lever 109. Movement of this lever, it will be seen, adjusts the distance of the plank ends from the ground. A suitable seat 110 is mounted on the beam 17.

In operation, the machine is drawn along the ground so that the stalks will enter the space between the planks and the lugs on the chains carry the stalks backward. The snapping rollers cooperate with the lugs and kicker to remove the ears from the stalks and also serve to uproot and remove the loose stalks. The ears are carried upwardly by the lugs and taken up by the lugs on chain 100 and drawn backwards to be dropped into the husking rolls. The straighteners straighten the ears and they are pressed firmly against the rolls by means of the spring arms 95. The huskings are stripped from the ears by the spiral rolls and dropped into the casing 84 and are blown therethrough by the fan 84'. The ears are then dropped into the elevator and removed, together with any shelled corn.

It will be seen that I have provided a very simplified corn harvester and husker driven from a single drive wheel in the most efficient manner, by reason of the snapping rollers, planks, kicker, chains, etc., and the particular form of gearing and shafting shown. If too great a load is sent through the planks they are capable of spreading and being returned to their original position. The same is true of the snapping and husking rolls.

While I have shown and described the preferred embodiment of my invention, it is to be understood that various changes in the shape, size and arrangement of parts may be resorted to without departing from the spirit of my invention or the scope of the subjoined claims.

Having thus described and illustrated my invention what I claim is:

1. In a device of the character described, a drive wheel, a pair of spaced planks, capable of being spread, and snapping rolls arranged to cooperate with said planks, said snapping rolls being capable of being spread.

2. In a device of this character described, a drive wheel, a pair of spaced planks, capable of being spread, snapping rolls arranged adjacent said planks and operatively connected to the drive wheel, said snapping rolls being capable of being spread, a chain arranged on one of said planks and having lugs extending over the space between the planks, and a kicker element adapted to reciprocate over the space between the planks.

3. In a device of the character described, a pair of spaced planks, snapping rolls carried thereby, husking rolls arranged at the ends of the planks, means to deliver the ears of corn to the husking rolls, reciprocating straighteners adapted to cooperate with said husking rolls, and spring arms adapted to positively press the ears firmly against said husking rolls at all times, said arms being capable of adjustment to vary their distance from the rolls.

4. In a device of the character described, a pair of spaced planks, capable of being spread, snapping rolls cooperating with said planks, said snapping rolls being capable of being spread, a chain mounted on one of said planks, a kicker element operated by said chain to partake of a circular movement over the space between the planks in a plane substantially parallel with the planks and remove the ears from the stalks, husking rolls arranged at the end of the planks, means to permit spreading of said husking rolls, means carried by said chains to carry the ears to said husking rolls, a reciprocating straightening element cooperating with said husking rolls, and spring arms adapted to press the ears against said rolls at all times.

5. In a device of the character described, a drive wheel, a drive shaft geared thereto, a clutch arranged at said shaft, a substantially vertically arranged shaft geared to said drive shaft, a pair of spaced planks, said vertical shaft extending through one of said planks, a cog on the end of said shaft, a chain engaging said cog and extending for the greater portion of the length of the plank, a pair of snapping rolls geared to said vertically arranged shaft and capable of spreading, a set of husking rolls, a shaft geared to said rolls to turn the same, said shaft being operatively connected to said drive shaft, a crank shaft arranged at one end of the rolls, straighteners arranged to cooperate with said rolls, means connecting said straighteners with the cranks of said shaft, means operatively connecting the crank shaft with the drive shaft, and spring arm always arranged in the path of the ears and adapted to press the ears against the husking rolls.

6. In a device of the character described, a drive wheel, a drive shaft geared thereto, a clutch cooperating with said shaft, a substantially vertically arranged shaft geared to the drive shaft, a pair of planks, the vertical shaft extending through one of the planks, a cog arranged on the end of the shaft, an idler cog on the opposite end of the plank, a chain passing around these cogs and having lugs extending over the space between the planks, said planks being capable of spreading, a pair of snapping rolls arranged beneath said planks and geared to the vertically arranged shaft, said snapping rolls being capable of spreading, a cog wheel arranged so as to engage the chain and be rotated thereby, a kicker element eccentrically mounted on said cog wheel and adapted to be operated thereby to assist in removing the ears from the stalks and husking rolls, the chain being adapted to deliver the ears to the husking rolls.

7. In a device of the character described, a pair of spaced planks, a wheel on one of said planks, means to turn said wheel, and a kicker element eccentrically mounted on said wheel and adapted to partake of a circular motion over the space between the planks to assist in removing the ears from the stalks.

8. In a device of the character described, a drive wheel, a pair of spaced planks, a pair of snapping rolls adjacent said planks and operatively connected to said drive wheel, a chain mounted on one of said planks and operatively connected to said drive wheel, a cog wheel mounted on one of said planks and adapted to engage the chain and be rotated thereby, and a kicker element eccentrically mounted on said cog wheel and adapted to partake of a circular movement over the space between the planks to cooperate with the snapping rolls in removing the ears from the stalks.

In testimony whereof I affix my signature.

ARTHUR C. BECKMAN.